United States Patent
Bennett et al.

(10) Patent No.: US 6,775,707 B1
(45) Date of Patent: Aug. 10, 2004

(54) DEFERRED ACKNOWLEDGMENT COMMUNICATIONS AND ALARM MANAGEMENT

(75) Inventors: William E. Bennett, Georgetown, TX (US); Ken J. Beoughter, Round Rock, TX (US); Robert B. Havekost, Austin, TX (US); John R. Shepard, Pflugerville, TX (US); Dwight D. Jennings, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/418,747

(22) Filed: Oct. 15, 1999

(51) Int. Cl.[7] .......................... G06F 15/16; H04L 12/28
(52) U.S. Cl. ............... 709/233; 370/395.4; 370/395.41; 370/468
(58) Field of Search ................................ 709/227, 206, 709/232, 233, 235; 370/229, 235, 329, 395.4, 395.41, 468

(56) References Cited

U.S. PATENT DOCUMENTS

| | | | |
|---|---|---|---|
| 5,222,061 A | 6/1993 | Doshi et al. ................... | 370/13 |
| 5,528,605 A | 6/1996 | Ywoskus et al. ............. | 371/33 |
| 5,872,777 A | 2/1999 | Brailean et al. ............ | 370/349 |
| 6,115,390 A * | 9/2000 | Chuah ........................ | 370/443 |
| 6,400,724 B1 * | 6/2002 | Yao ............................. | 370/429 |

FOREIGN PATENT DOCUMENTS

| | | | |
|---|---|---|---|
| EP | 0 991 244 A2 | 5/2000 | |
| WO | WO 96/36154 | 11/1996 | ........... H04L/29/06 |
| WO | WO 97/11541 | 3/1997 | ............. H04J/3/22 |
| WO | WO 99/07101 | 2/1999 | ............. H04L/1/18 |
| WO | WO 99/11012 | 3/1999 | ............. H04L/1/18 |

OTHER PUBLICATIONS

UK Patent Office Search Report under Section 17, dated Jun. 8, 2001.
Xiaoyan Fang and Dipak Ghosal, Analyzing Packet Delay Across A. GSM/GPRS Network, *IEEE*, 2003, pp. 1–10.
Examination Report under Section 18(3) issued in GB 00251363.3 application by the United Kingdom Patent Office on Jul. 24, 2003.

* cited by examiner

*Primary Examiner*—Krisna Lim
(74) *Attorney, Agent, or Firm*—Marshall, Gerstein & Borun LLP

(57) ABSTRACT

A communication technique enables the efficient transmission of data through a low bandwidth and/or time delayed communication link and minimizes the idle time of the communication link by using a deferred acknowledgment of message bundles to temporally pack the communication link. The transmitting system stores messages to be transmitted in a pending message queue and applies a dynamic window to the pending message queue to define a message bundle to be sent through the slow communication link. The transmitting system requests an acknowledgment for at least one message within the bundle, but does not require an acknowledgment for every message within the bundle. Transmitted messages are temporarily stored as outstanding messages in a retransmission queue until the transmitted messages are acknowledged or until a time-out period associated with the messages has lapsed. When the transmitting station receives a timely acknowledgment in response to a requested acknowledgment, the transmitting station removes all outstanding messages associated with that acknowledgment from the retransmission queue.

63 Claims, 9 Drawing Sheets

DEFERRED ACKNOWLEDGMENT COMMUNICATIONS AND ALARM MANAGEMENT

FIELD OF THE INVENTION

The invention relates generally to communication systems and, more specifically, to a communication technique that uses deferred acknowledgment of transmitted messages to increase data throughput in communication links that have a low bandwidth and/or a transmission time delay.

DESCRIPTION OF THE RELATED ART

Generally speaking, communication techniques provide a particular level of data throughput at a desired level of data integrity. Typically, a system designer selects an appropriate communication technique for an application by balancing the inherent tradeoffs between the data throughput and the data integrity provided by each of the available communication techniques against system cost objectives. In some applications, such as those involving communications between locally situated devices, like control devices, controllers, and workstations used in process control systems, a dedicated high speed databus (e.g., Ethernet) can be used to provide high levels of data throughput and integrity at a relatively low cost. In other applications, such as those involving communications between local and remotely situated devices, like control devices, controllers, and workstations used in process control systems, practical considerations and limitations compel system designers to use slow communication links, such as modem links, wireless cellular links, etc., that have a relatively low bandwidth or links that have a transmission time delay such as satellite communication links.

Using the above-mentioned slow communication links to accomplish communications between local and remote systems presents several significant problems. For example, slow communication links are typically highly susceptible to electromagnetic interferences that can result in the corruption of data transmitted through the link. Additionally, slow communication links are often associated with a purchased service such as telephone lines, cellular channels, or channel allocation within a satellite transponder bandwidth, which can result in a significant cost per unit of data sent through the link. Thus, communication techniques that "pack" the slow communication link with data in both the temporal and frequency dimensions of the link are highly desirable because they tend to increase data throughput and minimize cost per unit of data sent through the link.

For many applications, acceptable levels of data integrity and costs per unit of data sent can be achieved using conventional data encoding and channel modulation techniques within a one-way communication link. For instance, audio and video data is typically encoded prior to transmission using some type of forward error correction and/or convolutional encoding and may be effectively transmitted through the one-way communication link using a spread spectrum modulation technique. A receiving station may then demodulate and decode the transmitted data to generate audio and video signals having an acceptable integrity level. Because the receiving station does not communicate with the transmitting station, data that is severely corrupted or lost may not be recovered by the receiving station, thereby causing spurious errors within the video and audio signals provided to a user. While these spurious errors are undesirable, they do not have a significant impact on overall system performance because they are not easily perceived by the user. In this manner, conventional communication protocols for the transmission of audio and video data can eliminate the communication overhead that is normally associated with two-way communication techniques, which typically use a full-handshake communication protocol, without adversely affecting the qualitative performance of the system.

While the above-described approaches to transmitting data through a one-way communication link provide an acceptable level of data integrity for the reproduction of audio and video information, these approaches do not provide a level of integrity suitable for use in some other types of applications. For example, data associated with a process control system, such as data related to alarm conditions, may be of a highly critical nature because missing or corrupted alarm data may result in injury to personnel and/or damage to material, plant equipment, etc. Furthermore, one-way communication techniques are generally not suitable for use with process control systems because it is highly desirable (and often a requirement) for a local transmitting station to recognize that a remote receiving station is actually receiving and processing the data being sent to it by the transmitting station.

Traditionally, slow data communication links have used a two-way (i.e., full-duplex) communication technique that provides a full-handshake communication protocol requiring each transmitted message (which typically includes a plurality of data bytes) to be acknowledged by the receiving station before a subsequent message is sent. While these conventional full-handshake communication protocols provide an acceptable level of data integrity in, for example, process control systems, and allow the local transmitting station to ascertain whether or not the remote receiving station is receiving and processing the transmitted data, these protocols result in a low data throughput, which is highly disadvantageous where a great magnitude of critical data, such as alarm information on within a process control system is being transmitted.

The use of traditional full-handshake communication protocols is especially problematic when used in conjunction with satellite communication links because the round trip channel transmission time delay of these links may be several hundred milliseconds, which results in a significant amount of idle time for the communication link while the transmitting station waits for an acknowledgment of each message sent. Additionally, sending a large amount of information (e.g., from a local workstation operated by the user to a remotely situated workstation) may be perceptibly or even impractically slow for the user requesting the information. In any case, the inefficient use of the satellite communication link results in an unacceptably high cost per unit of data transmitted.

In addition to utilizing a full-handshake low level communication protocol to accomplish reliable communications via a slow communication link, many conventional process control systems use a full-handshake communication scheme at the application level so that each application message is acknowledged before a subsequent application message is transmitted through the slow communication link. For instance, conventional process control systems typically include alarm services in which alarms and alarm messages are sent to alarm subscribers that acknowledge receipt of the alarms. Thus, if alarm messages are sent through the slow communication link using a full-handshake communication protocol, the alarm will send application level acknowledgments for each of the particular alarm messages received. As a result, alarm messages sent through the slow communication link would actually be acknowledged twice (i.e., once by the low level full-handshake communication protocol and once at the application level). This redundant acknowledgment of alarm messages at the application level can significantly reduce the temporal efficiency of alarm communications through the slow communication

SUMMARY OF THE INVENTION

A communication technique is provided to enable the efficient transmission of data through a slow (i.e., low bandwidth and/or time delayed) communication link such as a satellite link, a cellular link, a wide area network, etc. Generally speaking, the communication technique minimizes the idle time of the communication link by using deferred acknowledgment of message bundles to temporally pack the communication link with multiple messages before receiving acknowledgments of any of the messages. More specifically, a message transmission portion of the communication technique sends messages over the communication link in message bundles without requiring express acknowledgments for all of the messages within the message bundles, but instead, requests acknowledgments for only some of the messages within the bundle with the understanding that an acknowledgment for one message implicitly acknowledges messages sent before that message. An acknowledgment processing portion of the communication technique processes acknowledgments received from the other end of the communication link corresponding to the transmitted message bundles and keeps track of which messages remain unacknowledged until the end of a time-out period associated with each message. Additionally, the communication technique consolidates redundant messages to minimize the total number of messages to be sent through the link to a receiving system.

In one embodiment, the transmitting system stores messages to be transmitted in a pending message queue and applies a dynamic window to the pending message queue to define a message bundle to be sent through the slow communication link. The transmitting station requests an acknowledgment for at least one message (e.g., the last message sent) within the bundle, but does not require an acknowledgment for every message within the bundle. Transmitted messages are temporarily stored as unacknowledged messages in a retransmission queue until the transmitted messages are acknowledged or until a time-out period associated with each of the messages has lapsed. When the transmitting station receives a timely acknowledgment in response to a requested acknowledgment, the transmitting station removes all outstanding messages associated with that acknowledgment from the retransmission queue. Each acknowledgment typically operates to acknowledge a plurality of messages. On the other hand, if a timely acknowledgment is not received, the transmitting station resends all messages that have timed out. As a result, the above-described communication technique can greatly reduce the communication link idle time associated with the prior art communication techniques by requesting acknowledgment for message bundles (or portions of bundles) and allowing the acknowledgments of the message bundles to be deferred to a later time while sending additional messages over the link.

A method in accordance with one aspect of the invention enables the transmission of a plurality of messages through a communication link having a round trip transmission time delay. The method establishes a first queue for storing messages to be sent through the communication link and a second queue for storing unacknowledged messages that have been sent into the communication link. The method uses a window having a lower end associated with a position within the first queue and an upper end associated with the position of the lower end and a number of outstanding messages contained in the second queue. The method applies the window to the first queue to define a message bundle containing one or more messages to be sent through the communication link and removes the one or more messages associated with the message bundle from the first queue. In addition, the method sends the one or more messages associated with the message bundle through the communication channel such that at least two of the messages within the message bundle are sent in an amount of time less than the round trip transmission delay, appends the sent one or more messages to the second queue, and acknowledges at least some of the sent one or more messages after the messages in the message bundle have been sent. The method may further include the steps of removing sent messages from the second queue and retransmitting messages that have timed out.

In accordance with another aspect of the invention, a system for sending a plurality of messages through a communication link includes a first data server having a first queue that stores messages to be sent through the communication link and a second queue that stores unacknowledged messages that have been sent into the communication link. The first data server may further include a first routine that sends a group of messages stored in the first queue into the communication link based on a number of messages stored in the second queue, a second routine that appends the sent group of messages to the second queue, and a third routine that processes acknowledgments associated with the sent group of messages to remove acknowledged messages from the second queue.

The system may further include a second data server that is communicatively coupled to the first data server via the communication link. The second data server may include a fourth routine that receives the sent group of messages via the communication link and that sends acknowledgments for one or more of the received sent group of messages to the first data server via the communication link.

In accordance with yet another aspect of the invention, a method of communicating application information in a process control system having a first portion that is communicatively coupled to a second portion via a communication link includes the steps of establishing an application client process within the first portion of the process control system and establishing an application server process within the second portion of the process control system. The method may send a first application message from the application server process to the application client process defining the messages to be sent periodically to the client process. The method may further send periodic application update messages to the client process and a second application message from the application client process to the application server process that enables the application server process to send messages to the application client process. In one embodiment, the application client process and the application server process may be associated with processing alarm information and some of the alarm information may be prioritized prior to transmission of the alarm information.

DESCRIPTION OF THE PREFERRED EMBODIMENTS

Figure 1:
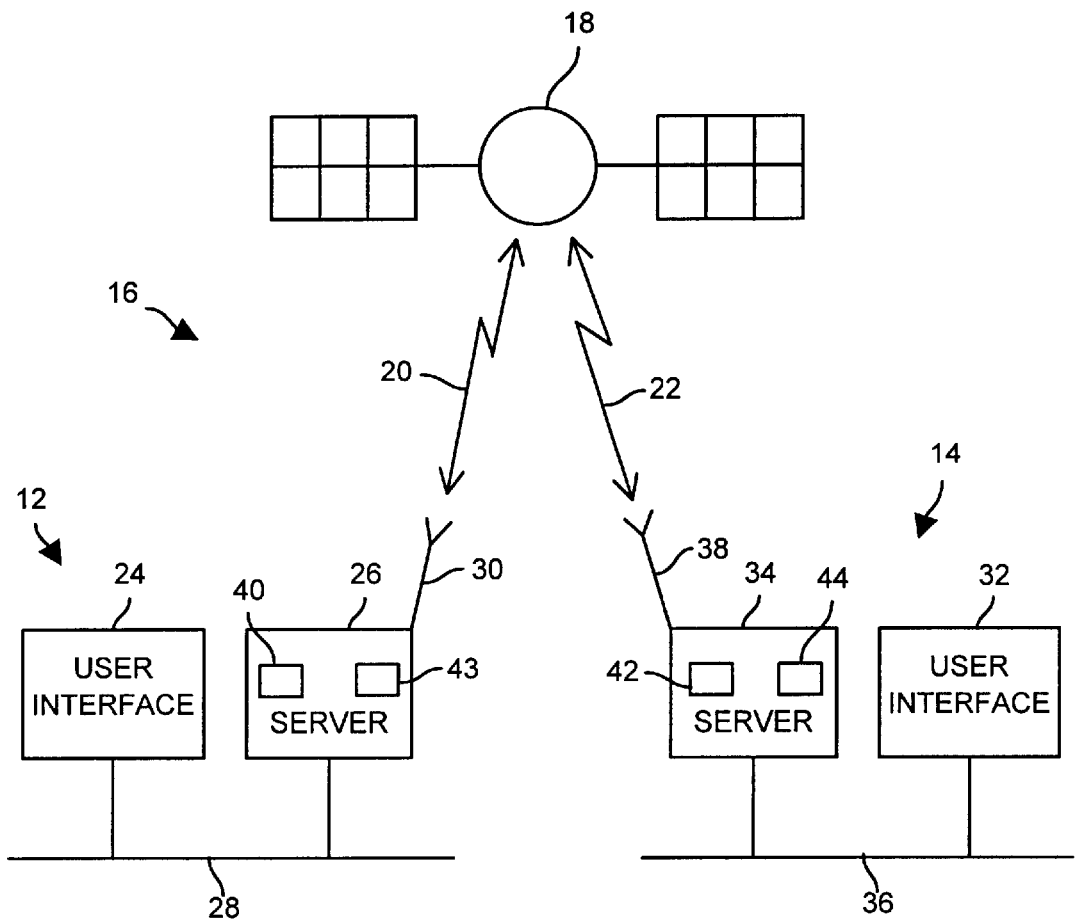
FIG. 1 is a schematic block diagram illustrating a local system that communicates with a remote system via a slow communication link using a deferred acknowledgment communication technique.

While a technique for transmitting information through a slow communication link is described in detail in conjunction with a satellite communication link having a transmission time delay, it should be noted that the communication technique described herein can be advantageously used as a low level communication protocol within a variety of communication systems, including, for example, low bandwidth systems that use modems, wireless cellular, wide area networks such as the Internet, etc., and higher level applications such as process control reporting, alarming, etc. that are layered over the communication systems. Furthermore, while described as being used in a process control system, the communication techniques described herein can be advantageously used in any other communication system that transmits data over a slow communication link.

Before discussing the deferred acknowledgment communication technique in greater detail, it is important to recognize that the conventional full-duplex communication techniques that are used in transmitting messages through slow communication links typically require an acknowledgment for each message sent and do not send a subsequent message until an acknowledgment for a previously sent message is received. In other words, these conventional communication techniques allow only one outstanding or unacknowledged message to exist at any given time. Because the round trip transmission time delay through the slow communication link is typically much greater than the time required to transmit a single message, conventional communication techniques result in a substantial amount of idle time on slow communication links, which results in low data throughout and high costs per unit of data sent through these links.

Additionally, the above-noted conventional communication techniques typically do not recognize and consolidate redundant messages. As a result, the effective throughput of the communication link is further decreased and the cost per unit of data transmitted is further increased, particularly where the same message is being requested on a periodic basis by multiple applications and/or workstations on a remotely located system.

The communication technique described herein enables the efficient transmission of data through a slow communication link. Generally speaking, the communication technique minimizes the idle time of the communication link by using deferred acknowledgment of message bundles to temporally pack the communication link. More specifically, a message transmission portion of the communication technique sends messages over the communication link in message bundles without requiring express acknowledgments for all of the messages within the message bundles, but instead, requests acknowledgments for only some of the messages within the bundle with the understanding that an acknowledgment for one message implicitly acknowledges messages sent before that message. An acknowledgment processing portion of the communication technique processes acknowledgments received from the other end of the communication link corresponding to the transmitted message bundles and keeps track of which messages remain unacknowledged until the end of a time-out period associated with each message. Additionally, the communication technique consolidates redundant messages to minimize the total number of messages to be sent through the link to a receiving system.

FIG. 1 is an exemplary schematic block diagram illustrating a local system 12 that communicates with a remote system 14 via a slow communication link 16 using a deferred acknowledgment communication technique, which is described in greater detail below. By way of example, the slow communication link 16 is a wireless link that uses a satellite relay 18 and uplink/downlink communication channels 20 and 22 to establish full-duplex communications between the systems 12 and 14.

The local system 12 includes a local user interface 24, which may be a workstation or any other type of computer or processor, that is connected in a communication network to a local data server 26 via a system level databus 28. The system level databus 28 may be an Ethernet databus or any other databus suitable for the transmission of data. The local server 26 includes an antenna 30 that enables communications on the uplink/downlink communication channel 20. Similarly, the remote system 14 includes a remote user interface 32 that is connected to a remote data server 34 via a remote system level databus 36. The remote server 34 includes an antenna 38 that enables communications on the uplink/downlink communication channel 22. The local server 26 and the remote server 34 include respective software routines 40 and 42 (that may be stored on respective computer readable memories 43 and 44) for performing the communication technique described herein.

As is generally known, because of the orbital distance of the satellite 18, the round trip transmission time delay through the uplink/downlink communication channels 20 and 22 may be approximately several hundred milliseconds. With conventional full-handshake communication techniques the communication link is idle during the round trip transmission delay because each message sent must be acknowledged before a subsequent message is sent. Because an idle time of several hundred milliseconds is typically substantially greater than a message duration (which may be tens of milliseconds) the temporal efficiency and the data throughput of the above-noted conventional communication techniques is very low and the cost per unit of data transmitted over the link is relatively high. With the communication technique described herein, however, messages are acknowledged in bundles, which typically include a plurality of messages, and acknowledgments for the message bundles may be deferred for a time greater than the round trip transmission time delay of the slow link 16. In this manner, the communication technique of the invention can temporally pack the uplink/downlink communication channels 20 and 22 with messages to reduce or to virtually eliminate the idle time of the slow communication link 16.

Additionally, the communication technique described herein further improves utilization of the slow communication link 16 by recognizing and eliminating the transmission of redundant messages. For example, the servers 26 and 34 can function as message multiplexers/demulitplexers so that only one copy of a message is actually transmitted through the slow communication link 16 despite multiple requests for the message within either of the systems 12 and 14.

Figure 2:
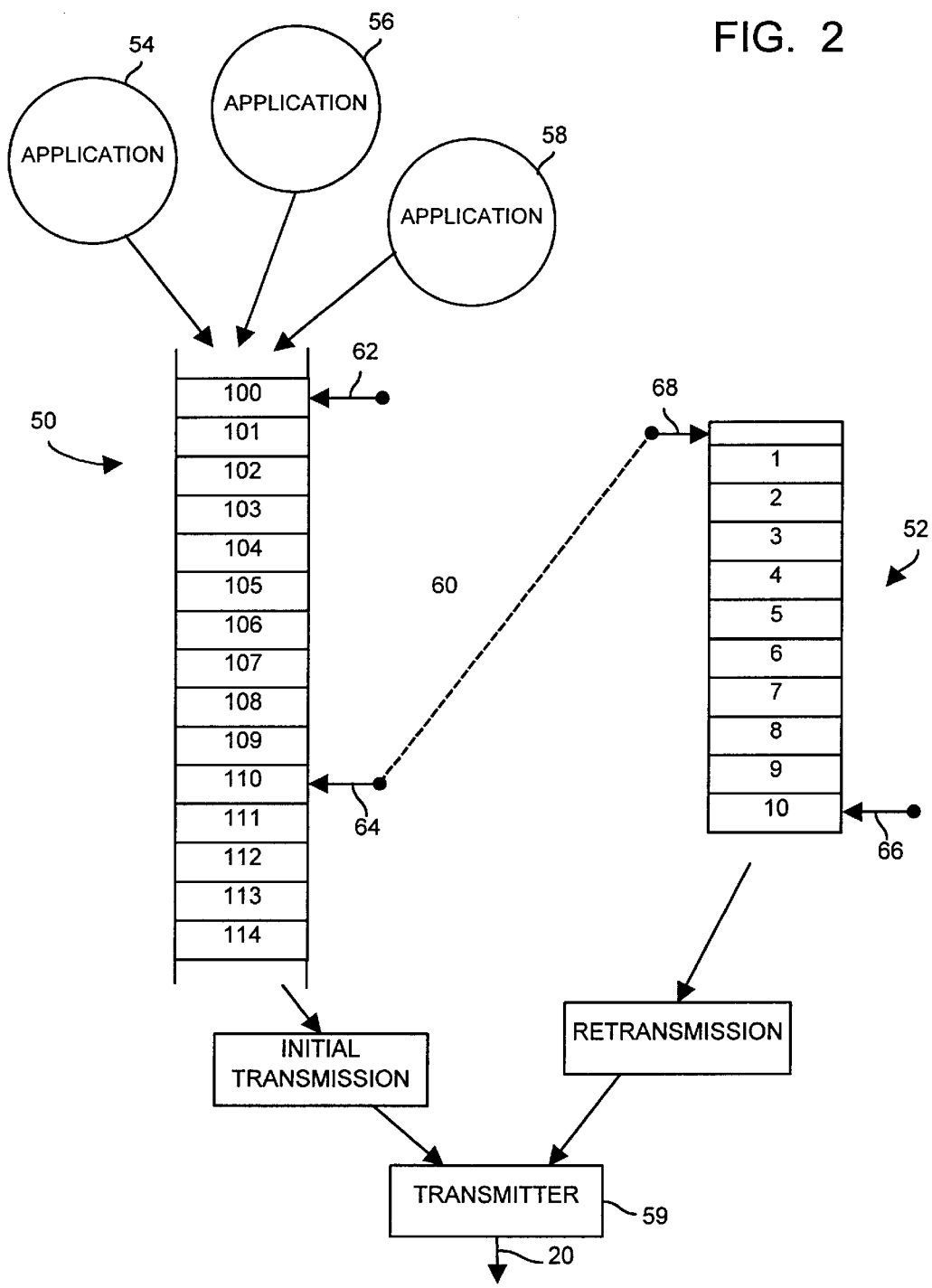
FIG. 2 is an exemplary block diagram illustrating a pending message queue and a retransmission queue that may be used within the deferred acknowledgment communication technique of FIG. 1.

FIG. 2 is an exemplary block diagram illustrating a pending message queue 50 and a retransmission queue 52 that may be used by the deferred acknowledgment communication routines 40 and 42 of FIG. 1. The local user interface 24 (FIG. 1) or any other process control device may be executing one or more applications 54–58, one of which may be, for example, an alarm management application, that asynchronously send messages over the system level databus 28 to the local server 26 for delivery to the remote system 14. The local server 26 appends the messages as they are received from the applications 54–58 to the pending message queue 50. Each of the messages is stored in the pending message queue 50 together with a sequence number identifying the order in which the message was received in the queue 50. For example, a sixteen-bit counter may be incremented each time a new message is sent by the local server 26 and the counter value may be associated with the received message as its sequence number. While FIG. 2 shows a portion of the pending message queue 50 that contains messages having sequence numbers 100–114, it should be recognized that any other manner of identifying the order in which the messages are sent by the local server 26 or any other manner of identifying the messages with sequence numbers could be used without departing from the scope of the invention.

The software routine 40 within the local server 26 includes a message transmission routine that removes messages from the pending message queue 50 according to the sequence numbers and delivers the messages to a transmitter 59, which transmits the messages through the uplink/downlink communication channel 20 using any known or desired protocol. The transmission routine appends each message together with a time stamp to the retransmission queue 52 immediately after sending the message (including the time stamp) into the slow communication link 16. The time stamp associated with each of the sent messages in the retransmission queue 52 represents the time at which the message was originally sent into the slow communication link 16. As will be discussed in greater detail below, transmitted messages are stored in the retransmission queue 52 as outstanding or unacknowledged messages until they are acknowledged by the remote system 14 or until the expiration of a time-out period as a result of the local server 26 not receiving timely acknowledgments from the remote server 34 for these messages.

The retransmission queue 52 holds a predetermined maximum number of outstanding messages. Generally, the retransmission queue 52 holds a number of outstanding messages sufficient to temporally pack the slow communication link 16. For example, if each message represents 30 milliseconds (ms) of transmission time and the round trip transmission time delay is about 300 ms, then the retransmission queue 52 may be configured to hold ten or more outstanding messages. Although the retransmission queue 52 in the above example could be configured to hold a much larger number of outstanding messages, a variety of considerations such as memory availability and the message time out period may define a practical upper limit.

The local server 26 defines a message bundle to be sent through the slow communication link 16 using a dynamic window 60 having a lower sequence number 62 and an upper sequence number 64 that are based on a maximum allowable number of outstanding messages 66 and the number of current outstanding messages 68. In general, the size of the window (i.e., the number of messages in the bundle) is inversely related to the number of current outstanding messages 68 so that message bundles taken from the pending message queue 50 contain a number of messages equal to the number of outstanding messages that can be added to the retransmission queue 52. For example, if the maximum number of outstanding messages 66 equals ten, the number of current outstanding messages 68 equals zero, and the next message to be sent (i.e., the message corresponding to the lower sequence number 62) has a sequence number equal to 101, then the upper sequence number equals 110, thereby creating a message bundle containing ten messages corresponding to the sequence numbers 101–110.

In this manner, the local server 26 (FIG. 1) stores messages to be transmitted in the pending message queue 50 (FIG. 2) and applies the dynamic window 60 to the pending message queue 50 to define a message bundle to be sent through the slow communication link 16. The local server 26 requests an acknowledgment for at least one message (e.g., the last message sent) within the bundle, but does not require an acknowledgment for every message within the bundle unless the message bundle only includes one message. Transmitted messages are temporarily stored as outstanding messages in the retransmission queue 52 until they are acknowledged or until a time-out period associated with the message has lapsed. When the local server 26 receives a timely acknowledgment in response to a requested acknowledgment, the local server 26 removes all outstanding messages associated with that acknowledgment from the retransmission queue 52. Importantly, as described in more detail below, each acknowledgment typically operates to acknowledge a plurality of messages. On the other hand, if a timely acknowledgment is not received after the time-out period associated with any message or bundle of messages the local server 26 resends all messages that have timed out. Thus, the communication technique described herein can greatly reduce the communication link idle time associated with the above-noted prior art techniques by requesting acknowledgment for message bundles having a plurality of messages therein and allowing the acknowledgments for the outstanding messages to be deferred until a later time (i.e., until after other messages have been sent into the communication link).

Figure 3:
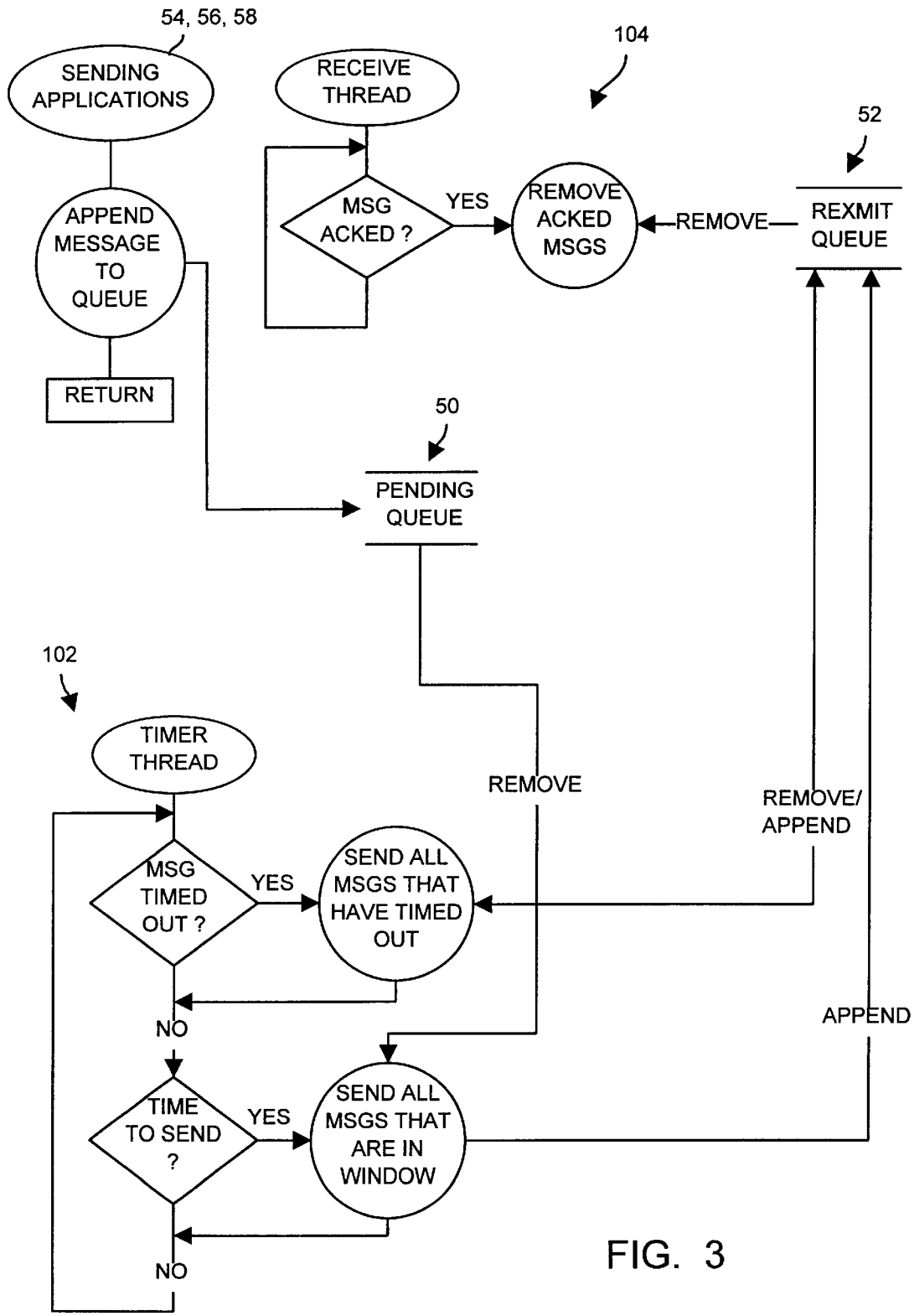
FIG. 3 is an exemplary flow diagram illustrating the movement of messages between the pending message queue and the retransmission queue of FIG. 2.

FIG. 3 is an exemplary flow diagram illustrating in greater detail the movement of messages between the pending message queue 50 and the retransmission queue 52 of FIG. 2. The flow of messages is primarily controlled by three processes or "threads." A sending process 100 appends messages received from one or more of the applications 54–58 that may be running on, for example, the user interface 24 of the local system 12 to the pending message queue 50. The sending process 100 appends messages to the pending message queue 50 together with a sequence number as described above. The availability of memory within the local system 12 may impose practical limitations on the number of messages contained in the pending message queue 50 at any given time. To accommodate these limitations, the sending process 100 may stop appending messages to the pending message queue 50 when the memory limitations are reached or are about to be reached. The sending process 100 may further indicate to the user via the user interface 24 the identity of any application that is generating an abnormally high number of messages so that corrective action can be taken.

A timer process 102 periodically removes a message bundle, which is defined by the dynamic window 60 (FIG. 2), from the pending message queue 50 and sends the messages within the bundle together with time stamps into (i.e., transmitted but not necessarily received by the remote server 34) the slow communication link 16. Each of the messages within the message bundle (including the time stamp) is appended to the retransmission queue 52. The retransmission queue 52 holds these copies of the sent messages as outstanding messages until they are acknowledged or until they have timed out.

The timer process 102 periodically scans the retransmission queue 52 for messages that have timed out by comparing the sum of the time stamp of each message (i.e., the time at which they were sent into the link) and a predetermined time out delay to a current time value. For example, if the round trip transmission time delay through the slow communication link 16 is about 300 ms then the predetermined time out delay may be selected to be about 600 ms. A time out delay of 600 ms allows for a full round trip transmission time delay plus additional time for processing etc. that occurs within the servers 26 and 34 and the satellite 18. When the timer process 102 identifies a message where the sum of the message time stamp value and the predetermined time out delay is less than the current time, the timer process 102 removes the message from the retransmission queue 52, resends the message through the slow communication link 16, and reappends the message to the retransmission queue 52 with a new time stamp value. In some applications, it may be desirable to limit the number of resends allowed for a given message and to notify the user of the problem so that corrective action may be taken to prevent unnecessary communication over the link 16.

During initialization of the systems 12 and 14 (FIG. 1), the timer process 102 may be used to automatically establish a suitable time out delay period using an actual measurement of the round trip transmission time delay through the slow communication link 16. For example, the local server 26 may send a synchronization request through the link 16 to the remote server 34. In response, the remote server 34 sends a synchronization reply through the link 16 to the local server 26. Upon receiving the synchronization reply, the local server 26 can measure the time difference between the time at which the synchronization request was sent and the time at which the synchronization reply was received to establish an initial measured round trip transmission time delay. Additionally, because the local server 26 time stamps all transmitted messages and all received acknowledgments, the initial measured round trip transmission delay can be updated on an ongoing basis by measuring the differences between the times at which acknowledgments were requested (i.e., sent by the local server 26 into the link 16) and the times at which corresponding acknowledgments for those requests are received by the local server 26.

A receiving process 104 receives express acknowledgments that are sent by the remote server 34 in response to acknowledgment requests made by the timer process 102 and in response to messages that are received out of order (e.g., a missing sequence number). The receiving process 104 uses the received express acknowledgments to remove messages from the retransmission queue 52. The receiving process 104 may use express acknowledgments of messages to implicitly acknowledge all messages having sequence numbers that precede the sequence number of the expressly acknowledged message. In other words, the receiving process 104 may use an express acknowledgment to remove the expressly acknowledged message from the retransmission queue 52 and to remove all messages preceding the expressly acknowledged message from the retransmit queue 52. For example, if the local server 26 requests acknowledgments for the fifth and tenth messages within a message bundle containing ten messages, the receipt of an acknowledgment in the local server 26 for the fifth message causes the receiving process 104 to remove the first through fifth of the messages from the retransmission queue 52. Likewise, when the acknowledgment of the tenth message is received, the receiving process 104 removes the sixth through tenth messages from the retransmission queue 52. However, in the case where the remote server 34 fails to receive a message (i.e., a sequence number is skipped or missing), the remote server 34 will automatically send an acknowledgment (whether or not an acknowledgment was requested by the local server 26) to the local server 26 for the last message that was received in order. Additionally, the remote server 34 will not send acknowledgments in response to receiving an out of order message (for which an acknowledgment is requested) until all preceding skipped or missing messages have been received. Because the receiving process 104 only removes expressly and implicitly acknowledged messages from the retransmission queue 52, as described above, messages that are not received by the remote server 34 remain on the retransmission queue 52. In other words, when the local server 26 receives an acknowledgment that was not requested, the receiving process 104 removes only those messages from the retransmission queue 52 that were received in order and leaves the messages that are missing on the retransmission queue 52 of the local server 26. These missing messages remain on the retransmission queue 52 and are resent to the remote server 34 when they time-out. The remote server 34 can use the sequence numbers of resent messages to properly insert the resent messages in order with previously received messages.

Using the above example (i.e., a message bundle containing ten messages with acknowledgment requests for the fifth and tenth messages), if the remote server 34 receives the first through the sixth messages and the eighth through tenth messages (i.e., it fails to receive the seventh message), the remote server 34 will send acknowledgments for the fifth and seventh messages. When the local server 26 receives the acknowledgment for the fifth message, the receiving process 104 removes the first through fifth messages from the retransmission queue 52. Similarly, when the local server 26 receives the acknowledgment for the seventh message, the receiving process 104 removes the sixth and seventh messages from the retransmit queue 52 and the eighth through tenth messages remain in the retransmission queue 52. Subsequently, when the time-out periods for the eighth through tenth messages lapse, the eighth through tenth messages will be retransmitted to the remote server 34.

Because of the transmission time delay through the slow communication link 16 and/or missing messages (i.e., messages not received by the remote server 34), the local server 26 may begin or even complete transmission of a subsequent message bundle before receiving any or all of the acknowledgments associated with a prior sent message bundle. Continuing with the above example, if a subsequent message bundle containing eleventh through fifteenth messages are sent into the communication link 16, then the retransmit queue 52 contains the eighth through tenth messages associated with the prior message bundle and the eleventh through fifteenth messages, which are associated with the subsequent message bundle. Thus, the remote server 34 may receive the eleventh through the fifteenth messages before the remote server 34 receives the retransmitted eighth through tenth messages. In that case, the remote server 34 may not send acknowledgments for the eleventh through fifteenth messages until the eighth through tenth messages are received by the remote server 34, which allows the local server 26 to follow the rule of removing messages from the retransmit queue 52 for which express acknowledgments are received and of removing all messages having sequence numbers preceding the expressly acknowledged messages.

Figure 4:
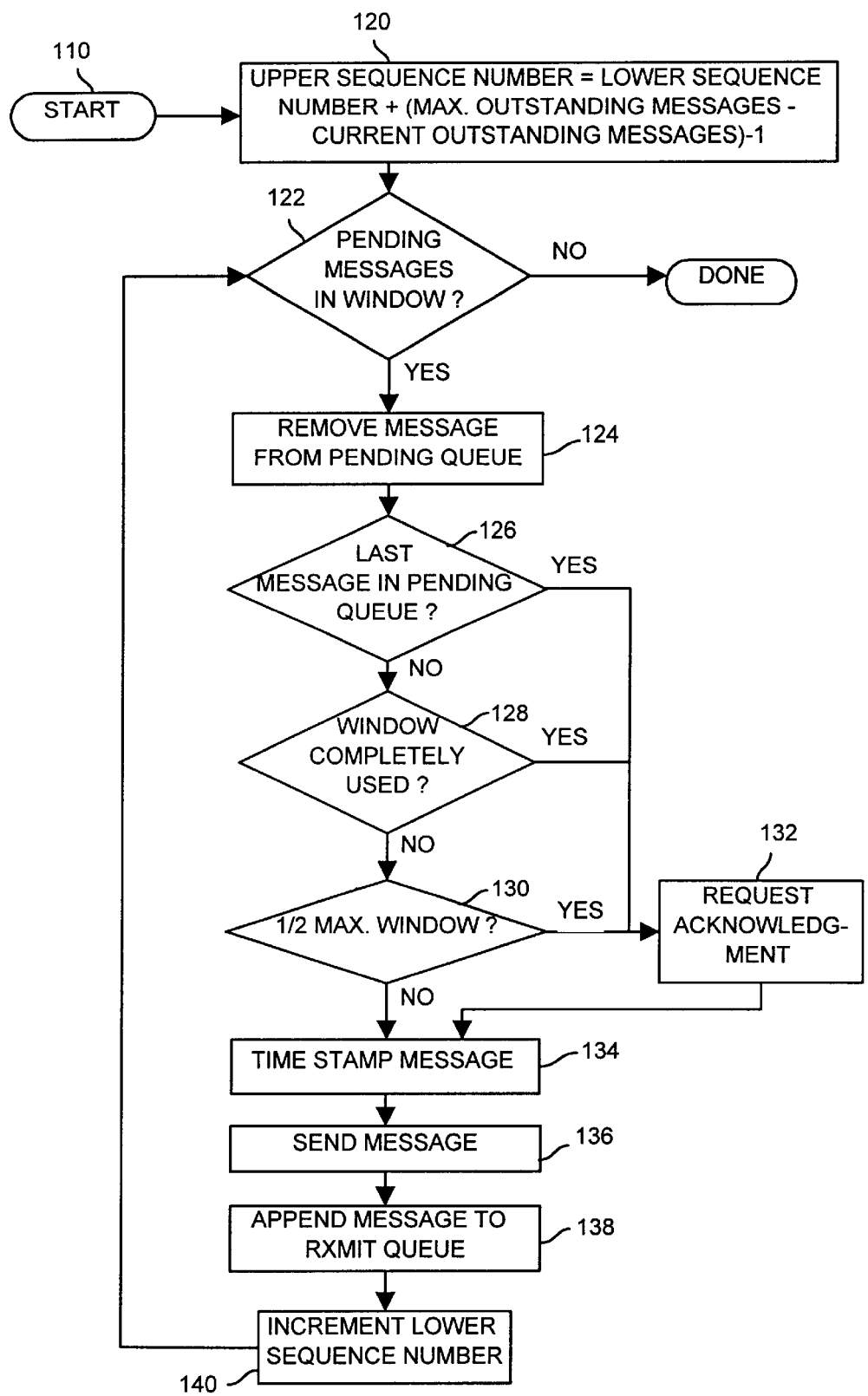
FIG. 4 is an exemplary flow diagram depicting a method by which a message bundle is sent to the remote system to accomplish data communication in the system of FIG. 3.

FIG. 4 is an exemplary flow diagram depicting a method 110 by which a message bundle is sent to the remote system 14 (FIG. 1) to accomplish a portion of the data flow of FIG. 3. The method 110 may be implemented by, for example, the routine 40 in the data server 26. In particular, FIG. 4 illustrates in greater detail how the timer process 102 can remove messages from the pending message queue 50, send messages through the slow communication link 16, and append sent/outstanding messages to the retransmission queue 52. A block 120 updates the upper sequence number 64 of the window 60 with the result of the current lower sequence number 62 of the window 60 plus the difference between the maximum allowable number of outstanding messages 66 and current number of outstanding messages 68 minus one. A block 122 determines if the dynamic window 60 contains any pending messages in the pending message queue 50. If there are no pending messages, the method 110 is done sending the message bundle and repeats. Otherwise, if there are pending messages within the dynamic window 60, a block 124 removes the message associated with the current lower sequence number 62 from the pending message queue 50. Block 126 determines if the removed message is the last message in the pending queue 50, block 128 determines if the removed message is the last message within the dynamic window 60, and block 130 determines if the removed message is the last message of a sub-bundle having a number of messages equal to, for example, half of the maximum allowable number of outstanding messages 66. If any of the checks made in the blocks 126–130 are true, then a block 132 sets data fields within the removed message to request an acknowledgment for that message or otherwise generates an acknowledgment request. On the other hand, if none of the checks made in the blocks 126–130 is true, then no acknowledgment is requested for the removed message. A block 134 then attaches a time stamp to the removed message and a block 136 sends the message (including the time stamp) into the communication link 16. A block 138 appends the sent message to the retransmission queue 52 and a block 140 increments the current lower sequence number 62 and provides control back to the block 122, whereby the method 110 is repeated.

While the blocks 126–130 described above set forth several exemplary conditions under which the local server 26 may request acknowledgment of messages, additional and/or different sets of conditions may be used. For example, the block 130 may request acknowledgments for any set of messages within a message bundle such as for sub-bundles of messages having a number of messages equal to one-third, one-quarter, or one-eighth, etc. of the maximum allowable number of outstanding messages 66. In any case, the conditions under which the local server 26 requests acknowledgments of messages are selected so that fewer acknowledgments than messages are sent through the slow communication link 16 and so that each acknowledgment can typically be used to expressly acknowledge one message and implicitly acknowledge one or more messages having sequence numbers preceding the expressly acknowledged message.

Generally speaking, the repetition of the above-described blocks 122–140 results in the sequential transmission of the messages making up a message bundle through the slow communication link 16. The number of messages in the message bundle varies according to the number of currently outstanding messages 68 so that at any given time the number of currently outstanding messages 68 does not exceed the predetermined maximum allowable number of outstanding messages 66. One or more of the messages within the bundle include a request for acknowledgment that is used by the remote server 34 to send an acknowledgment to the local server 26. However, the repetition of the blocks 122–140 does not require express acknowledgment of all the messages within the message bundle. Rather, as noted above, each acknowledgment received by the local server 26 expressly acknowledges the message that included the request for the acknowledgment and implicitly acknowledges messages having sequence numbers preceding the expressly acknowledged message.

Figure 5:
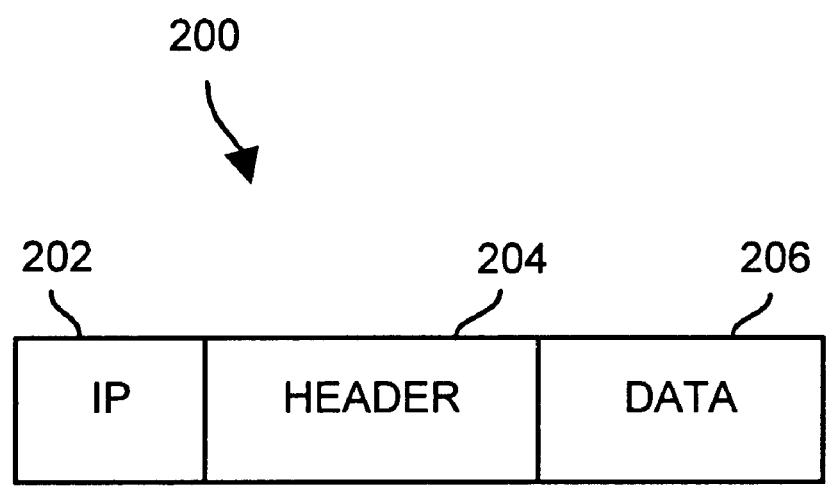
FIG. 5 is an exemplary block diagram illustrating one possible data format for messages transmitted between the local and remote systems of FIG. 1.

FIG. 5 is an exemplary block diagram illustrating one possible data format 200 for the messages transmitted between the local and remote systems 12 and 14 of FIG. 1. The data format includes an Internet protocol (IP) portion 202, a message header portion 204, and a message data portion 206. The IP portion 202 is preferably based on standard IP encapsulation techniques that are well-known in the art of network communications, however, other encapsulation techniques such as TCP, UDP, etc. may be substituted without departing from the scope of the invention. The message header portion 204 may include a variety of data fields such as a sequence number field, a request for acknowledgment field, time stamp information field, integrity flags, source and destination fields, primary/secondary indication fields, etc. that support or are related to the low level communication technique being used. The message data portion 206 may include data pertaining to a wide variety of information related to the applications 54–58 being executed within the systems 12 and 14 (FIG. 1). For example, the message data portion 206 may be real-time process control data such as alarms, process parameters, device information, or more generally, any type of information that may be requested by or that could be useful to the user. To further improve the efficient use of the slow communication link 16, the data portion 206 may include multiple pieces of information that may be associated with a plurality of controllers, devices, etc., which tends to maximize throughput in view of the fixed overhead associated with the IP portion 202 and the header portion 204.

Preferably, each of the messages in the pending message queue 50 contains the same number of data bytes, which could be 1500 bytes, for example. The number of data bytes within each of the messages may be selected to optimize the data throughput for the level of interference that is typically present in the slow communication link 16. For example, because long messages are statistically more likely to become corrupted than short messages and because only complete messages can be retransmitted through the channel, a relatively high level of interference in the slow communication link 16 tends to require a shorter message length. As a result, the optimum message length may be determined by striking a balance between the reduction in throughput associated with message retransmission as a result of message corruption and the reduction in throughput associated with having a larger number of short messages. Also, if desired, the messages or data therein may be error encoded to provide greater reliability.

The above-described communication technique enables a more efficient transmission of data through a slow communication link than was possible with conventional communication techniques. Generally speaking, the communication technique described herein minimizes idle time of the slow communication link by using a deferred acknowledgment of message bundles to temporally pack the communication link. More specifically, messages are sent over the communication link in message bundles without requiring acknowledgments for every message within the bundle and without waiting for acknowledgments between the transmission of the message bundles. The communication technique processes acknowledgments corresponding to one or more of the messages within the transmitted message bundles at a later time that may be at least one round trip transmission time delay through the slow link after the bundles were originally sent into the link.

Figure 6:
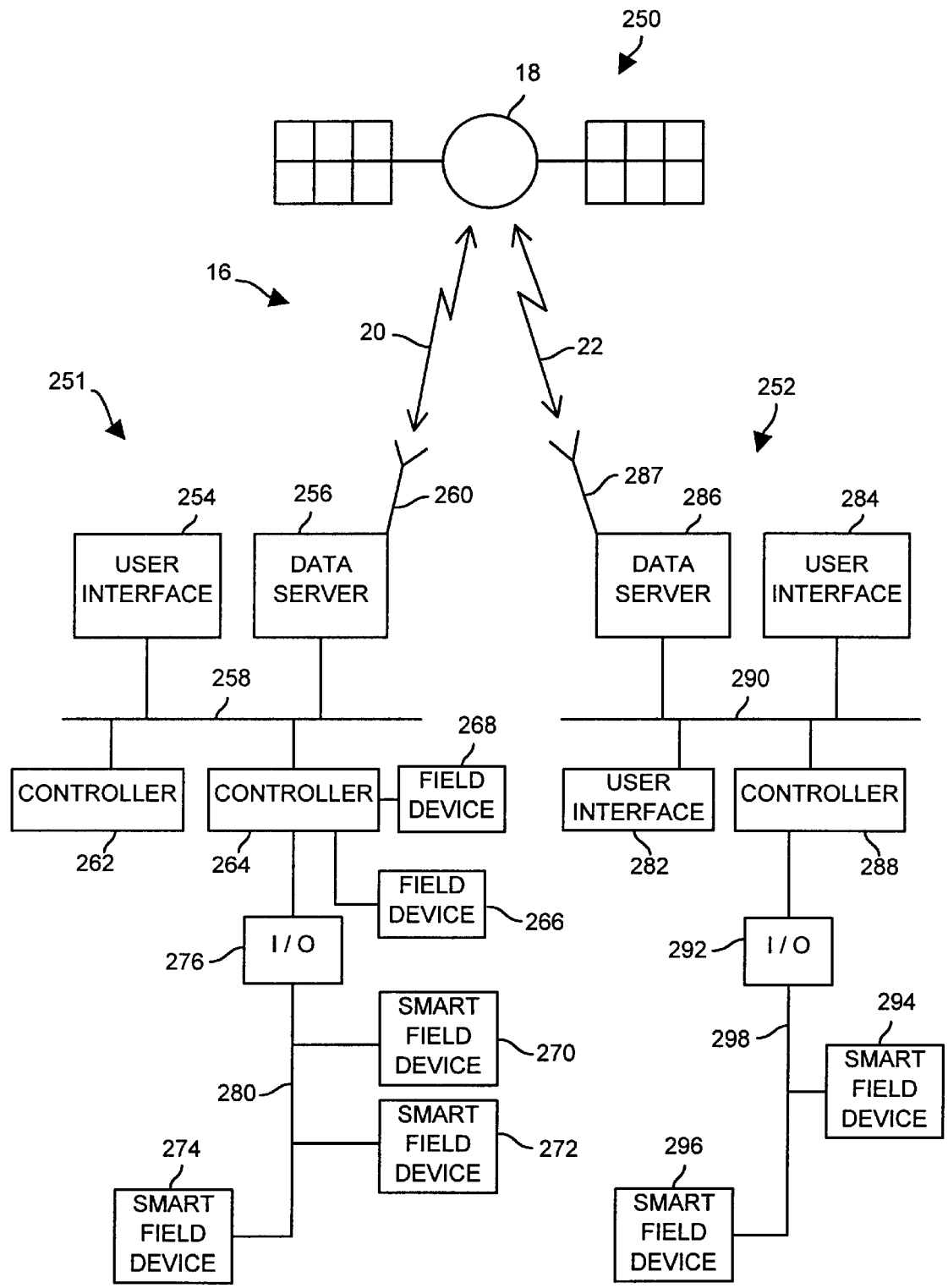
FIG. 6 is a schematic block diagram illustrating a process control system having a local portion that communicates with a remote portion via a slow communication link using the deferred acknowledgment communication technique of FIG. 1.

FIG. 6 is a schematic block diagram illustrating a process control system 250 having a local portion 251 that communicates with a remotely situated or remote portion 252 via the slow communication link 16 using the deferred acknowledgment communication technique described herein. The local portion 251 includes a user interface 254, which may be a workstation, that is connected in a communication network to a data server 256 via a system level databus 258. The system level databus 258 may be an Ethernet databus or any other databus suitable for the transmission of data. The local server 256 is coupled to an antenna 260 that enables communications on the uplink/downlink communication channel 20 of the satellite 18.

First and second controllers 262 and 264 are illustrated as being in communication with the user interface 254 and the data server 256 via the system level databus 258, of course, other devices such as data storage devices, additional user interfaces, etc. (not shown) may also be connected via the system level databus 258. By way of example, the second controller 264 may be a distributed control system (DCS) type controller and may communicate with the user interface 254 using an open or proprietary communication protocol, or using any other protocol, via the system level databus 258. The second controller 264 may, for example, send alarm and status information to the user interface 254 and may additionally receive user commands/requests from the user interface 254 via the system level databus 258. The second controller 264 may further include control algorithms for use in controlling field devices 266 and 268 that are connected to the controller 18 in any conventional or any other desired manner. The second controller 264 is also illustrated as being in communication with smart field devices 270–274 via an Input/Output (I/O) device 276. The field devices 270–274 are connected in a communication network via a non-proprietary protocol databus 280 and communicate with one another and the I/O device 276 to execute one or more process control loops either in conjunction with, or independently from, the controller 264. The smart field devices 270–274 may be, for example, Fieldbus devices, in which case the non-proprietary protocol databus 280 employs the Fieldbus signal protocol. However, other types of devices and protocols could be used as well such as the HART®, PROFIBUS®, WORLDFIP®, Device-Net®, CAN, and AS-Interface protocols. Similarly, the remote portion 252 includes user interfaces 282 and 284, a data server 286 which is coupled to an antenna 287, and a controller 288 that are communicatively coupled via a system level databus 290. The controller 288 of the remote system 252 may be connected to field devices and/or to smart field devices 294 and 296 via an I/O device 292, if desired.

The data servers 256 and 286 of the local and remote portions 251 and 252 of the system 250 use the above-described deferred acknowledgment communication technique to more efficiently utilize the slow communication link 16 than was possible with conventional communication techniques. For example, when the user requests data, such as real-time data associated with the local portion 251 via the user interface 284 of the remote portion 252, the user interface 254 or one of the controllers 262 and 264 uses the data server 256 to send message bundles through the slow communication link 16 to the remotely located data server 286 using the deferred acknowledgment communication technique described herein. In addition to substantially reducing the cost per unit of data sent through the slow link 16, the use of the deferred acknowledgment communication technique described herein allows a large amount of information to be exchanged between the local and remote portions 251 and 252 significantly more quickly than was possible with prior communication techniques. Also, because messages can be conveyed more quickly through the slow link 16, the user at the interface 254 may perceive the interaction with the remote portion 252 via the local user interface 254 as if this interaction was occurring via the user interface 284 of the remote portion 252.

As mentioned above, the communication technique described herein enables the data servers 256 and 286 to consolidate messages so that only one copy of a message is sent through the slow communication link 16 in response to multiple requests for the message. In effect, the data servers 256 and 286 can multiplex messages before sending them through the slow communication link 16 and can demultiplex messages that are received from the slow communication link 16. For example, if the controllers 262 and 264 of the local portion 251 of the system 250 have both been configured to make a periodic request (i.e., subscribe to) information contained within one of the smart field devices 294 and 296 of the remote portion 252, the data server 256 only stores one copy of the requested information and uses a one-to-many relationship to distribute the copy of the requested information to the controllers 262 and 264. Because the data server 256 of the local portion 251 keeps one copy of the requested information, the data server 286 of the remote portion 252 only sends one copy of the information through the slow link 16. More generally, the data servers 256 and 286 may both be configured to establish one-to-many relationships for information that is periodically conveyed through the slow communication link 16. In this manner, the data servers 256 and 286 can convey a single piece of information once through the slow communication link 16 and can distribute/receive multiple copies of the information to/from a plurality of user interfaces, controllers, devices, etc.

Figure 7:
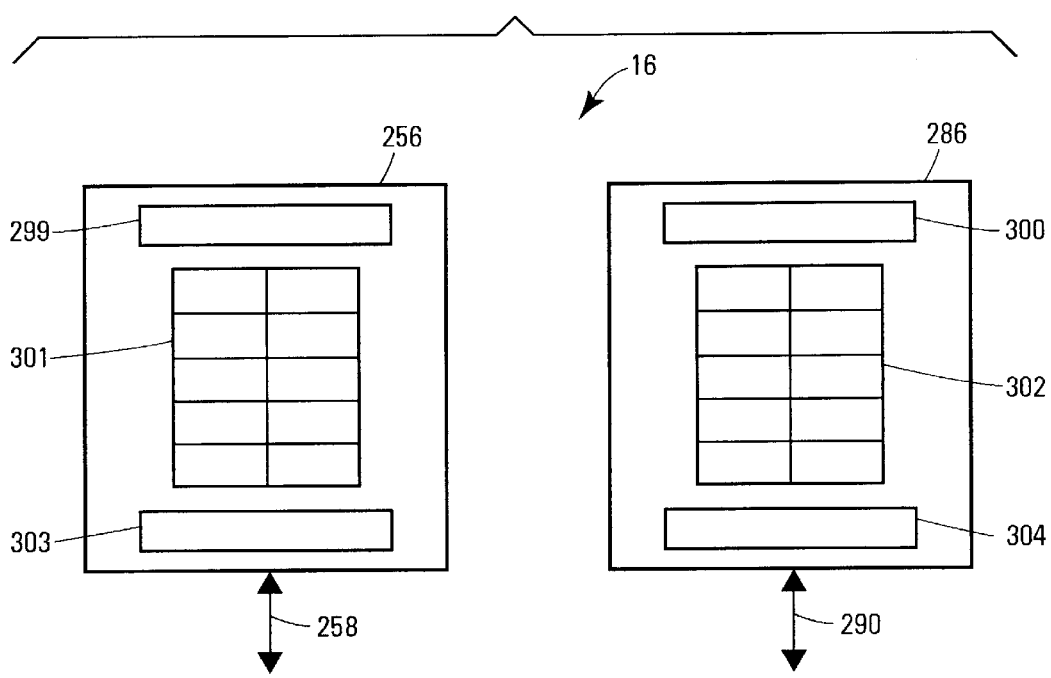
FIG. 7 is a schematic block diagram illustrating in more detail an exemplary manner in which data servers may be configured to consolidate messages sent through the slow communication link of FIG. 6.

FIG. 7 is a schematic block diagram illustrating in more detail an exemplary manner in which the data servers 256 and 286 of FIG. 6 may be configured to consolidate messages transmitted through the slow communication link 16. As illustrated in FIG. 7, the data servers 256 and 286 include remote link communication routines 299 and 300 that send and receive information through the respective uplink/downlink communication channels 20 and 22, parameter lists 301 and 302 that contain information associated with the controllers 262, 264 and 288 and other devices associated with the local and remote portions 251 and 252, and network communication routines 303 and 304 that send and receive information via the respective system level databusses 258 and 290.

Generally speaking, the lists 301 and 302 contain data that is shared between or transmitted between the local and remote portions 251 and 252 via the slow link 16 and may additionally include information that is shared between locally situated controllers. For example, the list 301 may contain information or data that is shared by the controllers 262 and 264. Generally, the remote link communication routines 299 and 300 allow the data servers 256 and 286 to exchange information contained within their respective lists 301 and 302 via the slow communication link 16, and may use, for example, the communication technique described with respect to FIGS. 1–5 to accomplish this communication. The network communication routines 303 and 304 allow the data servers 256 and 286 to exchange the information in the lists 301 and 302 with devices (associated with the local or remote portions 251 and 252) via the respective system level databusses 258 and 290.

The lists 301 and 302 may contain function block information and other control information associated with the control strategy of the controllers 262, 264 and 288, and may additionally include any other information associated with the local portion 251 or the remote portion 252 that may, for example, be requested by the user via one or more of the user interfaces 254, 282 and 284 or by the controllers 262, 264 and 288 within the system 250. The information in the lists 301 and 302 may be organized or indexed according to a tag description or any other description that uniquely identifies the various pieces of information that are stored in the lists 301 and 302.

In particular, the list 301 contains information that is needed by the local portion 251 and which is sent from the remote portion 252, and also contains information that is needed by the remote portion 252 and which is sent from the local portion 251. Similarly, the list 302 contains information that is needed by the remote portion 252 and which is sent from the local portion 251, and also contains information that is needed by the local portion 251 and which is sent from the remote portion 252. Additionally, the lists 301 and 302 may contain information that is locally shared between devices associated with the respective system level databusses 258 and 290. For example, some of the information in the list 301 may include information shared by controllers 262 and 264 which is not necessarily shared between the local and remote portions 251 and 252.

By way of example, if the controller 288 is configured to use a function block that requires an input from the field device 268, the controller 264 is configured to periodically publish the output of the field device 268 to the data server 256. Simultaneously, the user interface 282 may need this data from the field device 268 for display to a user and, accordingly, the controller 264 is also configured to publish this data to the user interface 282. The network communication routine 303 periodically receives the output data associated with the field device 268 and updates a location in the list 301 that contains the output data for the field device 268, however, only a single copy of this data is stored in the list 301 even though it may be published to two different devices (i.e., the controller 288 and the user interface 282 on the remote network 252). The remote communication routine 299 recognizes that the list 301 now contains updated information associated with the output of the field device 268 and uses the communication technique described herein to send this updated information over the slow communication link 16. The remote data server 286 receives the updated information associated with the field device 268 via the uplink/downlink communication channel 22. The remote communication link routine 300 then updates an appropriate location of the list 302 with the updated information associated with the field device 268. The network communication routine 304 recognizes that both the controller 288 and the user interface 282 require the information associated with the field device 268 (which is now stored in the list 302) to be published periodically on the system level databus 290. Accordingly, the communication routine 304 publishes the information associated with the field device 268 (that is contained in the list 302) to both the controller 288 and the user interface 282 regardless of whether or not the information has been updated.

As can be seen from the above example, the lists 301 and 302 allow the communication processes 299 and 300 associated with the slow link 16 and the communication processes 303 and 304 associated with the system level databusses 258 and 290 to operate asynchronously with respect to one another. For instance, the network communication routine 303 may receive information (and update the list 301) requested by the remote portion 252 at a first periodic rate, and the network communication routine 304 may publish the requested information (which is contained in the list 302) at a second periodic rate that may be different from the first periodic rate. Additionally, to eliminate unnecessary communications through the link 16, the remote communication link routines 299 and 300 may only send information in the respective lists 301 and 302 over the link 16 when the information has changed. Thus, if the network communication routines 303 and 304 are periodically refreshing information in the respective lists 301 and 302 with unchanged information, the remote communication routines 299 and 300 will not send the unchanged information through the slow communication link 16, thereby eliminating the transmission of redundant messages through the slow communication link 16.

One particularly interesting aspect of the above-described data servers 256 and 286 as described above is that the lists 301 and 302 in combination with the network communication routines 303 and 304 allow the data servers 256 and 286 to establish one-to-many relationships for the information stored in the lists 301 and 302. Thus, any number of devices on the remote system 252 can subscribe to the information within the list 302 and the network communication routine 304 needs only to track what device is subscribing to what data and periodically sends that data to all these devices from the list 302, even though that data is only sent over the link 16 once per update. Thus, the updated information for the field device 268 (that is contained in the list 302) can be sent once through the slow communication link 16 and then published to multiple devices via the network communication routine 304.

Figure 8:
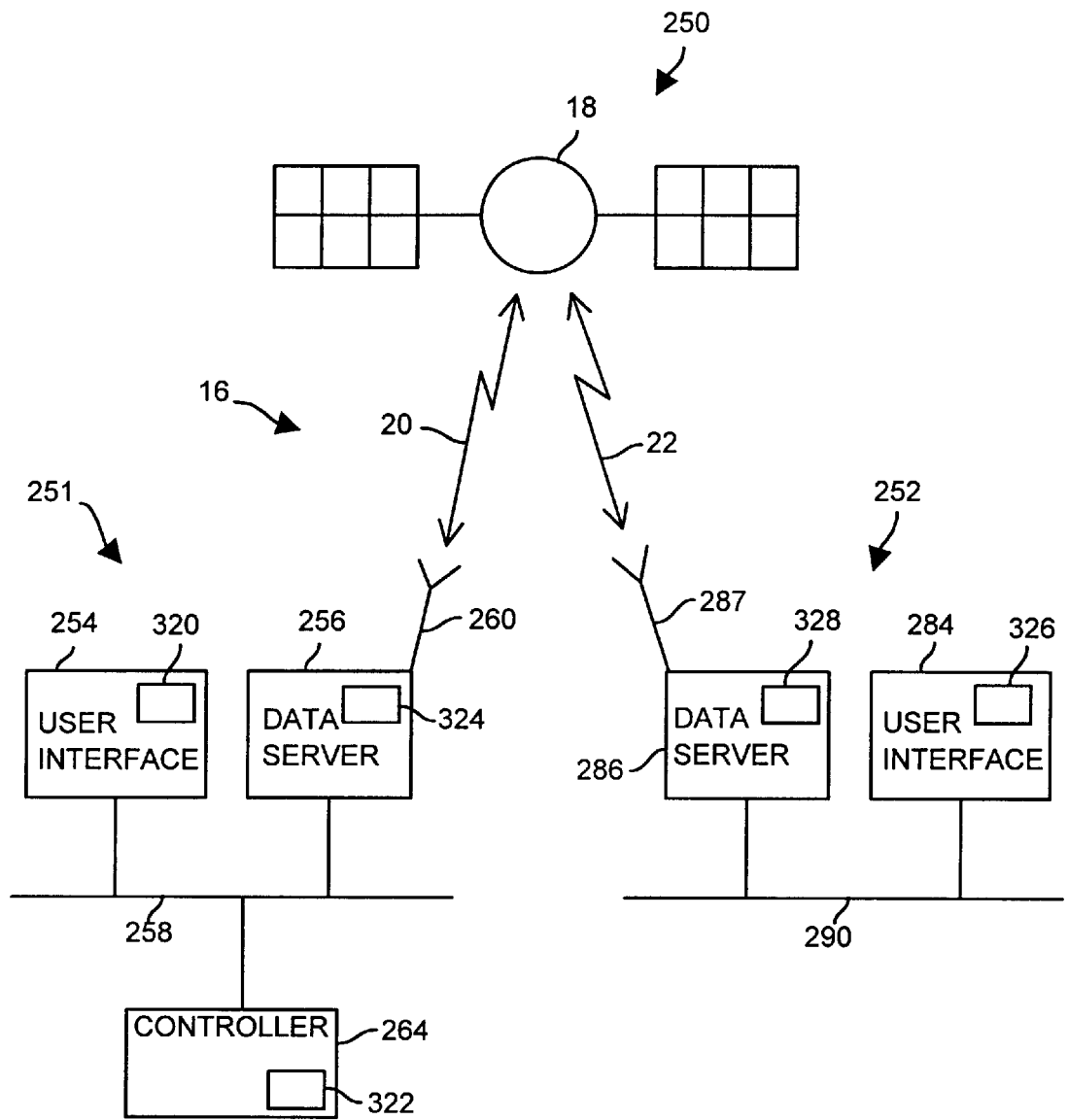
FIG. 8 is a schematic block diagram generally illustrating the software modules that enable transparent communications between the local and remote portions of the process control system of FIG. 6.

FIG. 8 is a schematic block diagram generally illustrating software modules that enable transparent communications between the local and remote portions 251 and 252 of the process control system 250 of FIG. 6. The user interface 254 of the local portion 251 includes a configuration routine 320 that configures control strategy routines 322 in the second controller 264 and that generates custom communication objects 324 within the local data server 256, and the remote data server 286 as necessary. Likewise, the user interface 284 of the remote portion 252 includes a configuration routine 326 that generates custom communication objects 328 within the remote data server 286 and the local data server 256 as necessary.

The configuration routine 320 of the local user interface 254 may configure the second controller 264 to make periodic requests for information associated with the devices of the local portion 251 and can additionally configure the second controller 264 to periodically request information from devices associated with the remote portion 252 via the local data server 256. To do so, the configuration routine 320 recognizes that communication of this data takes place over the slow link 16 and then automatically sets up custom communication objects 324 within the data server 256 that enable the data server 256 to recognize requests for information from the remote portion 252 and to route these requests through the slow communication link 16 to periodically retrieve the needed information from the data server 286 of the remote portion 252.

More generally, the custom communication objects 324 and 328 allow the data servers 256 and 286 to perform information routing functions between the local and remote sites as if they were connected to the same databus so that, from the perspective of the user at the user interface 254, the user interface 284 of the remote portion 252 appears to be communicating directly on the system level databus 258 of the local portion 251. In other words, the data servers 256 and 286 use the respective custom communication objects 324 and 328 to emulate the communication attributes of the user interfaces 254 and 284 so that communications between the local and remote portions 251 and 252 of the system 250 are completely transparent to the user. Additionally, this transparency extends to system configuration because the configuration routines 320 and 326 automatically create the custom communication objects 324 and 328. As a result the user can configure the system 250 without having to understand the technology associated with the communication protocol described herein or the slow communication link 16.

In particular, the controller 264 may be configured to publish data (that is to be delivered to the remote system 252) to the custom communication object 324 located within the data server 256. The communication object 324 then cooperates with the network communication routine 303 to cause the data server 324 to receive and then store the data in a particular location of the list 301, which has previously been configured to receive the data. As described above, the remote link communication routine 299 may then transmit the data stored in the list 301 over the slow link 16 using the communication technique described herein. When the data is received (within messages or message bundles) by the remote data server 286, it is stored in a particular location of the list 302 that has previously been configured to receive the data. The custom communication object 328 periodically retrieves the stored data from the particular location of the list 302 and cooperates with the network communication routine 304 to publish the data on the remote databus 290 to one or more subscribing devices, which may be, for example, the controller 288, the user interface 284, and/or any other device associated with the remote system 252.

As described above, the deferred acknowledgment communication technique described herein can be used within a process control system to enable transparent efficient (i.e., high throughput and low cost per unit of data sent), communications between a locally situated portion and a remotely situated portion of a control system that communicate via a slow communication link. Additionally, because the communication technique of the invention is a low level communication protocol, other applications running within the local and remote portions of the process control system may be layered over this communication protocol to enable the applications to communicate efficiently across the slow communication link.

One particularly important type of application that is commonly used with process control systems is the communication and reporting of alarm conditions or alarm messages that alert the user to unusual, and possibly dangerous, events occurring within the process control system. In conventional process control systems, the user interface typically provides alarm state information within a graphical display that may include blinking elements, audible annunciation, etc., to quickly alert the user to take corrective actions. In these conventional process control systems, alarm messages are verified or acknowledged each time the alarm message is sent from any device that generates the alarm. If such an alarm acknowledgment scheme was used in a conventional process control system having a slow communication link the alarm acknowledgment may be slow and consume a significant portion of the total bandwidth of the slow link. These communication difficulties are further compounded by the fact that the remote system may generate a large number of alarms approximately simultaneously when a portion of the process loses control (e.g., in a plant upset condition).

An exemplary alarm management application that can be layered over the above-described communication technique to enable efficient communication of alarm information associated with a remote portion of a process control system to a user interface at a local portion of the process control system is discussed in more detail below with respect to FIG. 9.

Figure 9:
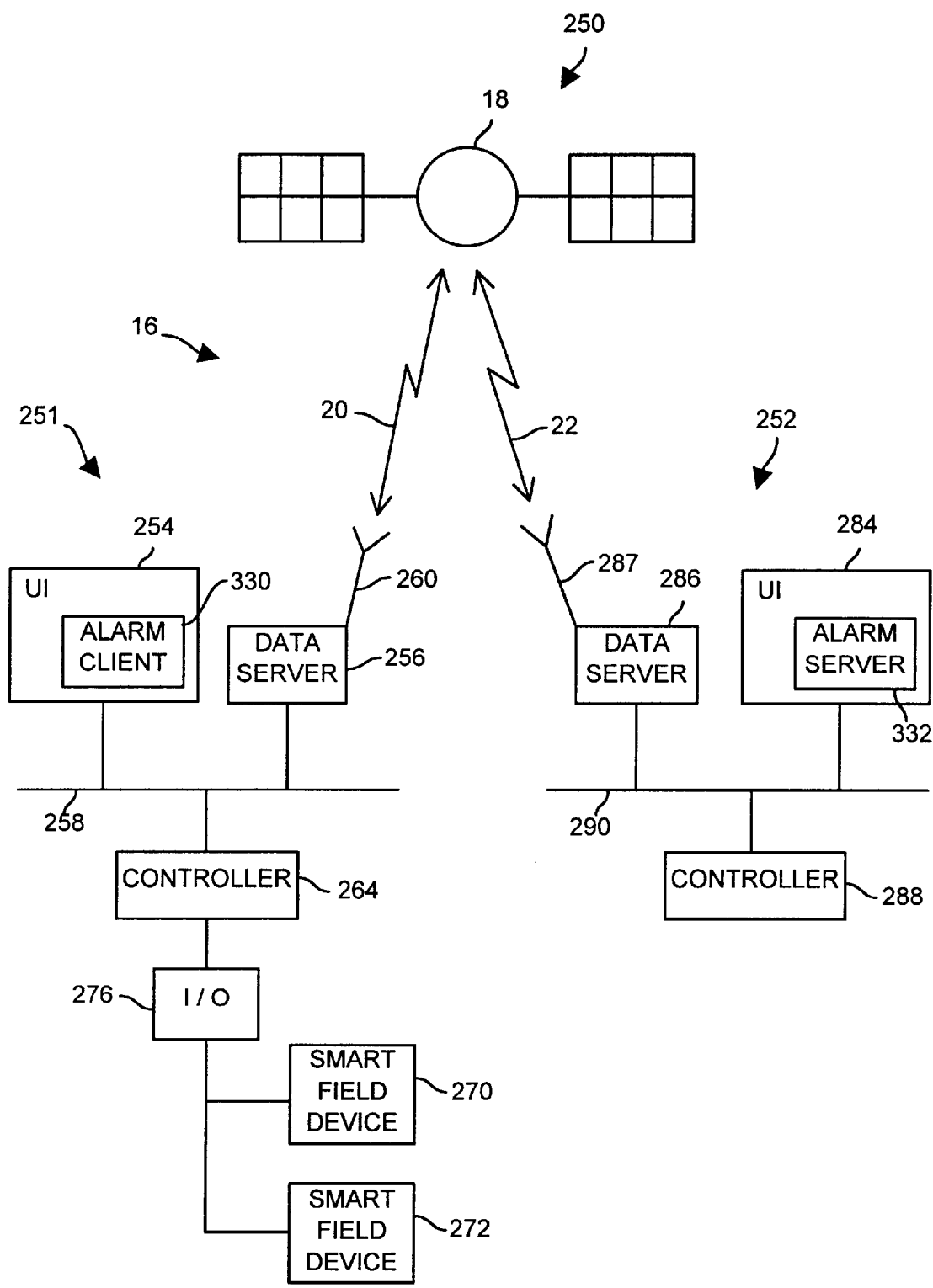
FIG. 9 is a schematic block diagram illustrating a client/server alarm management application that uses the deferred acknowledgment communication technique of FIGS. 1 and 6.

FIG. 9 is a schematic block diagram illustrating a client/server alarm management application that uses, for example, the deferred acknowledgment communication technique of FIGS. 1 and 6 to efficiently communicate alarm information from the remote portion 252 of the system 250 to the user interface 254 of the local portion 251 of the system 250. The local user interface 254 includes an alarm client process 330 that sends SUBSCRIBE messages and FLOW CONTROL messages to an alarm server process 332 within the remote user interface 284. Conversely, the alarm server process 332 periodically sends ALARM UPDATE messages to the alarm client process 330 in response to the SUBSCRIBE messages received from the alarm client process 330.

As will be described in greater detail below, the alarm client process 330 and the alarm server process 332 cooperate to send alarm information through a slow communication link. Preferably, the alarm client and server processes 330 and 332 overlay the deferred acknowledgment communication technique described above. In other words, the alarm server process 332 uses the deferred acknowledgment communication technique as a low level communication protocol to send message bundles containing consolidated alarm information associated with the remote portion 252 to the local portion 251. Similarly, the alarm client process 330 uses the same low level communication protocol to receive message bundles containing the alarm information from the remote portion 252. Integrity of the alarm client and server processes 330 and 332 is maintained via a periodic exchange of messages between the client and server processes 330 and 332 which allows the processes 330 and 332 to notify one another that they are still functioning properly.

Because the underlying deferred acknowledgment communication protocol provides express and implicit acknowledgments for all message bundles, including message bundles containing alarm information such as the message bundles provided by alarm server process 332, additional acknowledgments at the alarm management application level (i.e., at the level of the client and server processes 330 and 332) can be eliminated. This elimination of process level acknowledgments, which are commonly used in conventional alarm management techniques, allows the alarm information to be temporally packed in the slow communication link 16 within the message bundles that are sent through the link 16 using the deferred acknowledgment communication technique described herein.

Generally speaking, the alarm client 330 subscribes to particular alarms from the alarm server 332 by sending a SUBSCRIBE message to indicate all the alarms to be sent to the alarm client 330 from the alarm server 332 then periodically sends ALARM UPDATE messages to provide alarm information to the alarm client 332. The alarm client 332 keeps track of the alarms by alarm sequence number and may notify the alarm server 332 of a missed or dropped message, or request resynchronization via a FLOW CONTROL message.

More particularly, SUBSCRIBE messages from the alarm client process 330 include information identifying the local user interface 254 (to enable the alarm server 332 to send/route messages to the alarm client 330), the set of plant areas for which the alarm client 330 is requesting information, and a flag to indicate that if the alarm client 330 is requesting a resynchronization cycle to be initiated by the alarm server 332. Additionally, the SUBSCRIBE messages may include information associated with the frequency at which the alarm client 330 repeats SUBSCRIBE messages to the alarm server 332 so that the alarm server 332 can determine if the alarm client 330 is no longer communicating, which allows the alarm server 332 to de-allocate unused resources (e.g., processing and memory resources) that are being maintained for the alarm client 330. The SUBSCRIBE messages also include information associated with the frequency at which the alarm server 332 is to send ALARM UPDATE messages to the alarm client 330 so that the alarm client 330 can determine when the alarm server 332 is no longer communicating, which enables the alarm client 330 to remove erroneous alarm information from the display of the local user interface 254.

The ALARM UPDATE messages include an alarm sequence number (that is not typically associated with the sequence numbers associated with the underlying communication protocol) which allows the alarm client 330 to identify that no alarm messages within a sequence of messages have been dropped (i.e., lost). The ALARM UPDATE messages may further include information associated with the alarm state, such as an alarm ID string that uniquely identifies each alarm within the process control system 250, a current alarm state (such as whether or not the alarm is disabled, suppressed, inactive-acknowledged, active-acknowledged, inactive-unacknowledged, or active-acknowledged), the plant area within which the alarm was detected, the time of the most recent alarm state or priority change, the alarm priority, the alarm type (e.g., "HIGH," "LOW," "HIGH-HIGH," etc.), and a descriptive message that may facilitate the user's ability to respond in an appropriate manner to the alarm condition.

The FLOW CONTROL messages that the alarm client 330 sends to the alarm server 332 include information that identifies the alarm client 330 so that the alarm server 332 may send/route information to the alarm client 330, a flag that indicates that the alarm client 330 is requesting that a resynchronization cycle be initiated by the alarm server 332, which may be invoked by the alarm client 330 if the ALARM UPDATE messages indicate a message was lost, and information that controls the number of outstanding alarm messages, which functions at the alarm management application layer in a manner similar to the manner in which the underlying communication technique of the invention controls the number of outstanding messages in the retransmission queue 52 (FIG. 2).

Generally speaking, the alarm client 330 monitors the need for alarm state information by other processes that are running on the local user interface 254 and consolidates the same information into a single set of plant areas associated with the needed alarms. If the consolidated set of plant areas changes, the alarm client 330 sends a subscription message containing the new set of plant areas to the alarm server 332. If new plant areas are added to the list, then the subscription message includes a flag that requests a resynchronization cycle. Even if the subscribe information is unchanged, the alarm client 330 periodically resends the SUBSCRIBE messages so that the alarm server 332 knows that the alarm client 330 continues to function properly and to ensure that the alarm server 332 has the correct subscription information. If the time between ALARM UPDATE messages exceeds the update frequency requested in the SUBSCRIBE message, the alarm client 330 considers the alarm server 332 inoperative and notifies the applications being executed within the local user interface 254 that alarm information may be erroneous. The alarm client 330 publishes information associated with active alarms, ordered by importance, as special parameters that are available to other applications being executed within the local user interface 254. These special parameters are preferably published using data formats that are compatible with industry standard interfaces to process control information.

As indicated above, the alarm client 330 receives ALARM UPDATE messages from the alarm server 332. Upon receipt of the ALARM UPDATE messages, the alarm client 330 compares the sequence number of the alarm message with an expected sequence number (i.e., the sequence number of the last update message received incremented by one). If the sequence number of the received message is the same as the last message received, then the ALARM UPDATE message is discarded as a duplicate without requiring a resynchronization cycle. If the sequence number received matches the expected number, then the alarm information contained in the message is integrated into an active alarm list that is maintained by the alarm client 330. Based on the alarm state information, new alarms may be added to the active alarm list, inactive alarms may be removed from the list, and changes to the active alarms (e.g., change in priority) may be integrated into the list.

The alarm server 332 combines the set of plant areas subscribed to by the remote user interface 284 and performs the necessary alarm state information collection from the controller 288 to ensure that the alarm server 332 has a current list of active alarms from all the controllers associated with the remote portion 252 of the system 250. The alarm server 332 contains a list of active alarms for each of the required plant areas and contains inactive alarms if the alarm state has not yet been communicated to the subscribing alarm client 330. In operation, as new alarms state changes are detected and arrive from the controller 288, the alarm server 332 integrates the information into its active alarm lists and buffers the alarm state information in ALARM UPDATE messages that are constructed for the alarm client 330. If the alarm state information cannot be buffered, as a result of having reached the maximum allowable number of outstanding ALARM UPDATE messages, then the alarm state information is included with the alarm in the active alarm list of the alarm server 332 that indicates that the alarm state information still needs to be "flushed" (i.e., sent to the alarm client 330) as soon as the alarm client 310 begins to respond with FLOW CONTROL messages indicating that more ALARM UPDATE messages in the sequence can be sent.

The alarm server 332 can further detect when the alarm server 332 cannot send another message because the alarm client 330 has not responded with a FLOW CONTROL message. This "flow limited" situation may occur when the volume of new alarm state changes is relatively large in comparison to the throughput of the slow communication link 16. In these flow limited situations the alarm server 332 may employ a priority driven alarm flushing technique that ensures that the most critical or important alarms are conveyed as soon as possible to the alarm client 330 via the slow link 16.

The alarm server 332 periodically checks for and discards alarms that are in an inactive state despite the fact that the alarm client 330 has been notified of the inactivity. The alarm server 332 may also periodically check if the alarm client 330 is still functioning by comparing the amount of time that has passed since the alarm client 330 last sent a SUBSCRIBE message to the current time and the expected frequency with which SUBSCRIBE messages are to be received by the alarm server 332. If the alarm server 332 determines that the alarm client 330 is no longer functioning, then the alarm server 332 unsubscribes the alarm client 330 and de-allocates the resources held for the alarm client 330.

While the alarm management application discussed above and shown in FIG. 8 shows a single alarm client 330 in communication with a single alarm server 332, a number of alarm clients and servers can be used in both the remote and locally situated portions of a process control system. Furthermore, the alarm server 332 can function as a client of another alarm server so that a multi-tiered network of alarm clients and servers can be formed such that one or more levels of the alarm management hierarchy communicates via the slow communication network 16 or via cascaded slow links.

Thus, the above-described alarm management application more efficiently transmits alarm information through communication links, and is particularly advantageous when used to transmit alarm information through a slow communication link. The alarm management application consolidates alarm information into message bundles and uses the communication technique described above to send the message bundles over a slow communication link. The alarm messages are not individually acknowledged and typically, as discussed in detail above, one acknowledgment may be used to acknowledge a number of messages, including alarm messages. Because the alarm management application consolidates alarm information and because each alarm is not individually acknowledged, the alarm management application described above more efficiently utilizes the bandwidth of a slow communication link and can more quickly convey a large amount of alarm information in response to plant upsets, for example, which allows the user to take corrective action sooner.

Generally, the above-described deferred acknowledgment communication technique and alarm management applications may be efficiently implemented using a general purpose processor to execute a number of software code segments or modules that are retrieved from a computer readable memory. However, other combinations of hardware and software using, for example, algorithm specific integrated circuits (i.e., ASICs) or other types of hardware or firmware may be used to accomplish the same functions without departing from the scope of the invention.

While the above described communication technique may use data or information queues to store information, data, or message that are to be sent through a communication link, any other method of organizing the data to be sent through the link may be used without departing from the scope of the invention.

If implemented in software, the functional blocks and routines discussed herein may be stored in any computer readable memory such as on a magnetic, an optical, or other storage medium, in a RAM or ROM of a computer, controller, field device, etc. Likewise, this software may be modulated on a carrier and delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and the scope of the invention.

What is claimed is:

1. A method of sending a plurality of messages through a communication link having a round trip transmission time delay, the method comprising the steps of:

establishing a first queue for storing messages to be sent through the communication link;

establishing a second queue for storing unacknowledged messages that have been sent into the communication link;

defining a window having a lower end associated with a position within the first queue and an upper end based on the position of the lower end and a number of unacknowledged messages contained in the second queue;

applying the window to the first queue to define a message bundle containing one or more messages to be sent through the communication link;

removing the one or more messages associated with the message bundle from the first queue;

sending the one or more messages associated with the message bundle through the communication channel such that at least two of the messages within the message bundle are sent in an amount of time less than the round trip transmission time delay;

appending the sent one or more messages to the second queue; and receiving acknowledgments of some of the sent one or more messages after the messages in the message bundle have been sent.

2. The method of claim 1, wherein the step of establishing the second queue includes the step of defining a predetermined maximum number of unacknowledged messages that may be contained in the second queue.

3. The method of claim 2, wherein the predetermined maximum number of unacknowledged messages is based on the round trip transmission time delay of the communication link.

4. The method of claim 1, wherein the step of establishing the first queue includes the step of providing a sequence number for each of the messages stored in the first queue, and wherein the step of defining the window includes the step of associating the lower end of the window with a first sequence number that is associated with the next message to be sent into the communication link.

5. The method of claim 4, wherein the step of defining the window includes the step of associating the upper end of the window with a second sequence number wherein the difference between the second sequence number and the first sequence number is inversely related to a number of messages currently stored in the second queue.

6. The method of claim 1, wherein the step of sending the one or more messages associated with the message bundle includes the step of attaching a time stamp to each of the one or more messages prior to sending the one or more messages into the communication link.

7. The method of claim 6, further comprising the step of removing from the second queue the sent one or more messages appended to the second queue that have timed out.

8. The method of claim 7, further comprising the step of retransmitting through the communication link the sent one or more messages appended to the second queue that have timed out.

9. The method of claim 1, wherein the step of sending the one or more messages associated with the message bundle includes the step of requesting an acknowledgment for one of the messages in the message bundle.

10. The method of claim 9, wherein the step of requesting an acknowledgment includes the step of requesting an acknowledgment for every set of a predetermined number of messages wherein the predetermined number is less than the maximum number of unacknowledged messages that may be contained in the second queue.

11. The method of claim 10, wherein the predetermined number of messages is equal to one half of the maximum number of unacknowledged messages that may be contained in the second queue.

12. The method of claim 10, wherein the predetermined number of messages is set as a modulus of the predetermined maximum number of unacknowledged messages that may be contained in the second queue.

13. The method of claim 9, wherein the step of requesting an acknowledgment includes the step of requesting an acknowledgment for the last message within the message bundle.

14. The method of claim 1, further comprising the step of receiving acknowledgments for transmitted messages and of removing acknowledged messages from the second queue.

15. The method of claim 14, wherein the step receiving an acknowledgment includes the step of acknowledging two or more of the sent one or more messages based on a single received acknowledgment.

16. A communication technique for conveying data between a first data server and a second data server that is communicatively coupled to the first data server via a communication link which uses data acknowledgments, the technique comprising the steps of:
   establishing a first queue in the first data server to store data to be sent through the communication link;
   establishing a second queue in the first data server to store data that has been sent into the communication link and that has not been acknowledged;
   applying a window to the first queue to define a group of data to be sent through the communication link;
   sending the group of data into the communication link at a first time;
   appending the group of data to the second queue as a result of sending the group of data into the communication link;
   receiving an acknowledgment for at least one of the group of data at a second time that is greater than the first time; and
   removing the acknowledged data from the second queue upon receiving the acknowledgment.

17. The technique of claim 16, wherein the step of removing the acknowledged data from the second queue includes the step of removing two or more data items from the second queue.

18. The technique of claim 16, wherein the step of establishing the second queue in the first data server includes the step of defining a predetermined maximum amount of data that may be contained in the second queue.

19. The technique of claim 18, wherein the predetermined maximum amount of data that may be contained in the second queue is determined by a round trip transmission time delay of the communication link.

20. The technique of claim 16, wherein the step of applying the window to the first queue includes the step of determining a window size based on an amount of unacknowledged data in the second queue.

21. The technique of claim 16, wherein the step of sending the group of data includes the step of attaching time stamps to the data within the group of data prior to sending the group of data into the communication link.

22. The technique of claim 21, further comprising the step of determining a time-out period for the data within the sent group of data and removing from the second queue data within the second queue that has timed out.

23. The technique of claim 22, further comprising the step of retransmitting data within the second queue that has timed out.

24. The technique of claim 16, wherein the step of sending the group of data includes the step of requesting an acknowledgment for one member of the group of data.

25. The technique of claim 24, wherein the step of requesting an acknowledgment includes the step of requesting an acknowledgment based on a particular amount of data that is less than a predetermined maximum allowable amount of data that can be contained in the second queue and that is greater than one.

26. The technique of claim 25, wherein the amount of data is equal to one half of the predetermined maximum allowable amount of data that can be contained in the second queue.

27. The technique of claim 25, wherein the particular amount of data is determined using a modulus of the predetermined maximum allowable amount of data that can be contained in the second queue.

28. The technique of claim 24, wherein the step of requesting an acknowledgment includes the step of requesting an acknowledgment for a last item of data within the group of data.

29. A method of sending a plurality of messages through a communication link, comprising the steps of:
   storing messages to be sent through the communication link in a first queue;
   defining a message window size for selecting messages from the first queue, wherein the window size is greater than one;
   applying a window of the window size to the first queue to define a message bundle including a first number of messages up to the window size;

sending the first number of messages associated with the message bundle into the communication link;

sending an acknowledgment request with one of the first number of messages in the message bundle;

storing the sent first number of messages in a second queue; and removing acknowledged messages from the second queue.

30. The method of claim 29, wherein the step of defining the window size includes the step of determining the window size based on a number of messages currently stored in the second queue.

31. The method of claim 30, wherein the window size is inversely related to the number of messages currently stored in the second queue.

32. The method of claim 29, wherein the step of storing messages in the first queue includes the step of providing a sequence number for each of the messages stored in the first queue.

33. The method of claim 29, wherein the step of sending the first number of messages into the communication link includes the step of attaching a time stamp to each message prior to sending each of the first number of messages into the communication link.

34. The method of claim 33, further comprising the step of determining a time-out period for the messages in the second queue and removing timed out messages from the second queue.

35. The method of claim 34, further comprising the step of retransmitting timed out messages.

36. The method of claim 29, wherein the step of sending an acknowledgment request includes the step of sending an acknowledgment request for every second number of messages wherein the second number is less than the window size.

37. The method of claim 36, wherein the second number is equal to one half of the window size.

38. The method of claim 36, wherein the second number is determined using a modulus of the window size.

39. The method of claim 29, wherein the step of sending an acknowledgment request includes the step of sending an acknowledgment request for a last message within the message bundle.

40. A deferred acknowledgment communication system for use in a data transmission system having a data server with a processor communicatively coupled to a communication link, the communication system comprising:

a computer readable medium;

a first storing routine stored on the computer readable medium and adapted to be executed by the processor that stores data to be sent through the communication link in a first queue;

a second storing routine stored on the computer readable medium and adapted to be executed by the processor that stores data that has been sent into the communication link in a second queue;

a windowing routine stored on the computer readable medium and adapted to be executed by the processor that uses a window to define a group of data stored in the first queue to be sent through the communication link;

a sending routine stored on the computer readable medium and adapted to be executed by the processor that sends the group of data into the communication link;

an appending routine stored on the computer readable medium and adapted to be executed by the processor that appends the group of data to the second queue as a result of the group of data being sent; and an acknowledging routine stored on the computer readable medium and adapted to be executed by the processor that receives an acknowledgment for some of the group of data and that removes the data associated with the received acknowledgment from the second queue.

41. The system of claim 40, wherein the windowing routine is further adapted to determine a window size based on the amount of data stored in the second queue.

42. The system of claim 40, wherein the sending routine is further adapted to attach time stamps to the data in the group of data prior to sending the group of data into the communication link.

43. A deferred acknowledgment communication system for use in a data transmission system having a data server communicatively to a communication link, the communication system comprising:

a computer readable medium;

a first storing routine stored on the computer readable medium and adapted to be executed by the data server that stores messages in a first queue to be sent through the communication link;

a defining routine stored on the computer readable medium and adapted to be executed by the processor that defines a window size for selecting messages from the first queue;

a windowing routine stored on the computer readable medium and adapted to be executed by the data server that applies a window of the window size to the first queue to define a message bundle including a number of messages up to the window size;

a first sending routine stored on the computer readable medium and adapted to be executed by the data server that sends the number of messages of the message bundle into the communication link;

a second sending routine stored on the computer readable medium and adapted to be executed by the data server that sends an acknowledgment request with one of the sent number of messages;

a second storing routine stored on the computer readable medium and adapted to be executed by the data server that stores the sent number of messages in a second queue; and an acknowledgment tracking routine stored on the computer readable medium and adapted to be executed by the data server that removes acknowledged messages from the second queue.

44. The system of claim 43, wherein the windowing routine is further adapted to define the window size based on a number of messages currently stored in the second queue.

45. The system of claim 44, wherein the windowing routine selects window size as inversely related to the number of messages currently stored in the second queue.

46. The system of claim 44, wherein the first sending routine is further adapted to attach a time stamp to each message from the message bundle prior to sending the messages of the message bundle into the communication link.

47. The system of claim 46, further comprising a retransmitting routine stored on the computer readable medium and adapted to be executed by the data server that determines a time-out period for each one of the sent number of messages stored in the second queue and retransmits ones of the sent number of messages stored in the second queue that have timed out.

48. The system of claim 43, wherein the second sending routine is further adapted to send an acknowledgment request for every second number of messages, wherein the second number is less than the window size.

49. The system of claim 48, wherein the second number is equal to one half the window size.

50. The system of claim 48, wherein the second number is determined using a modulus of the window size.

51. A system for sending a plurality of messages through a communication link, comprising:

a first data server having;

a first queue that stores messages to be sent through the communication link, a second queue that stores unacknowledged messages that have been sent into the communication link, a first routine that sends a group of messages stored in the first queue into the communication link wherein the number of messages within the group of messages is based on a number of messages stored in the second queue, a second routine that appends the sent group of messages to the second queue and, a third routine that processes acknowledgments associated with the sent group of messages to remove acknowledged messages from the second queue; and a second data server that is communicatively coupled to the first data server via the communication link, the second data server including:

a fourth routine that receives the sent group of messages via the communication link and that sends acknowledgments for one or more of the received sent group of messages to the first data server via the communication link.

52. The system of claim 51, wherein the communication link includes a satellite communication link.

53. The system of claim 51, wherein the communication link includes a wireless cellular link.

54. The system of claim 51, wherein the communication link includes a modem link.

55. The system of claim 51, wherein the fourth routine is further adapted to send an acknowledgment in response to a request for acknowledgment associated with the received sent group of messages.

56. The system of claim 51, wherein the fourth routine is further adapted to send an acknowledgment in response to a received message within the received sent group of messages that is received out of order.

57. The system of claim 51, wherein the first and second data servers include one-to-many relationships for messages that are sent through the communication link.

58. A method of sending a plurality of messages through a communication link that has a round trip transmission delay and that uses data acknowledgment, the method comprising the steps of:

sending a first message into the communication link;

sending a second message into the communication link without waiting for acknowledgment of the first message; and requesting an acknowledgment for the second message.

59. The method of claim 58, further comprising the steps of receiving an acknowledgment of the second message and using the received acknowledgment to expressly acknowledge the second message and to implicitly acknowledge the first message.

60. The method of claim 59, further comprising the step of sending one or more further messages between the first and second messages.

61. The method of claim 60, further comprising the step of using the received acknowledgment to implicitly acknowledge the one or more further messages.

62. The method of claim 58, wherein the steps of sending the first and second messages into the communication link include the step of attaching time stamps to the first and second messages prior to sending the first and second messages into the communication link.

63. The method of claim 62, further comprising the step of identifying messages from the sent first and second messages that have timed out and resending the messages that have timed out into the communication link.

* * * * *

UNITED STATES PATENT AND TRADEMARK OFFICE
CERTIFICATE OF CORRECTION

PATENT NO. : 6,775,707 B1  
DATED : August 10, 2004  
INVENTOR(S) : William E. Bennett et al.

It is certified that error appears in the above-identified patent and that said Letters Patent is hereby corrected as shown below:

Column 3,  
Lines 7-8, please insert -- link. -- after "slow communication"

Column 22,  
Line 11, please delete "message" and insert -- messages --

Column 23,  
Line 50, please delete "step receiving" and insert -- step of receiving --

Column 26,  
Line 17, please delete "communicatively to" and insert -- communicatively coupled to --

Signed and Sealed this

Fifth Day of April, 2005

JON W. DUDAS  
*Director of the United States Patent and Trademark Office*